(12) United States Patent
Jung

(10) Patent No.: US 10,877,887 B2
(45) Date of Patent: Dec. 29, 2020

(54) DATA STORAGE DEVICE AND OPERATING METHOD THEREOF

(71) Applicant: SK hynix Inc., Gyeonggi-do (KR)

(72) Inventor: In Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/110,503

(22) Filed: Aug. 23, 2018

(65) Prior Publication Data

US 2019/0227931 A1 Jul. 25, 2019

(30) Foreign Application Priority Data

Jan. 25, 2018 (KR) .................. 10-2018-0009577

(51) Int. Cl.
*G06F 12/02* (2006.01)
*G06F 12/0811* (2016.01)
*G06F 12/1009* (2016.01)

(52) U.S. Cl.
CPC ...... *G06F 12/0811* (2013.01); *G06F 12/1009* (2013.01); *G06F 2212/62* (2013.01)

(58) Field of Classification Search
CPC ............ G06F 12/0811; G06F 12/0246; G06F 12/1009; G06F 12/0607; G06F 3/06; G06F 12/02
USPC ............................................. 711/3, 151, 153
See application file for complete search history.

(56) References Cited

U.S. PATENT DOCUMENTS

| | | | |
|---|---|---|---|
| 8,825,942 B2 * | 9/2014 | Ye ..................... | G06F 3/0613 707/693 |
| 10,713,157 B2 * | 7/2020 | Widder ............... | G06F 12/0292 |
| 2012/0284587 A1 * | 11/2012 | Yu ..................... | G06F 3/0608 714/773 |
| 2014/0208004 A1 * | 7/2014 | Cohen ................ | G06F 12/0246 711/103 |
| 2015/0067286 A1 * | 3/2015 | Colgrove ............ | G06F 3/0608 711/162 |
| 2015/0347026 A1 * | 12/2015 | Thomas .............. | G06F 3/0611 711/103 |
| 2016/0291884 A1 * | 10/2016 | Halaharivi ........... | G06F 3/0613 |
| 2017/0185319 A1 * | 6/2017 | Kim .................... | G06F 3/0688 |
| 2019/0065310 A1 * | 2/2019 | Rozas ................. | H03M 13/23 |
| 2019/0286555 A1 * | 9/2019 | Park ................... | G06F 3/0614 |

FOREIGN PATENT DOCUMENTS

KR 100881052 1/2009

OTHER PUBLICATIONS

Ashok K. Sharma, "HighPerfornnance Dynamic Random Access Memories," in Advanced Semiconductor Memories: Architectures, Designs, and Applications , IEEE, 2003, pp. 129-235.*

* cited by examiner

*Primary Examiner* — Pierre Miche Bataille
(74) *Attorney, Agent, or Firm* — IP & T Group LLP

(57) ABSTRACT

A data storage device may include: a nonvolatile memory device including first and second memory regions configured to be read-interleaved with each other; and a processor configured to select a first read command among read commands received from a host device, select a second read command among the read commands excluding the first read command, and control the nonvolatile memory device to perform map read on the first and second read commands at the same time. The processor selects, as the second read command, at least one read command that is configured to be read-interleaved with the first read command.

13 Claims, 13 Drawing Sheets

AMT

L1 Map Table

L2 Map Table

L2 Map Table

| Segment | Logical Address | Physical Address |
|---|---|---|
| L2P S1 | LBA1 | PBA1 |
|  | LBA2 | PBA2 |
|  | LBA3 | PBA3 |
|  | LBA4 | PBA4 |
| ⋮ | ⋮ | ⋮ |
| L2P Sj | LBAk-3 | PBAk-3 |
|  | LBAk-2 | PBAk-2 |
|  | LBAk-1 | PBAk-1 |
|  | LBAk | PBAk |

L2P entry (pointing to LBA1/PBA1 row)

FIG.3C

L1 Map Table

L2P segment entry →

| D1/PLG1 | | | | D1/PLG2 | | | | |
|---|---|---|---|---|---|---|---|---|
| PL1 | | PL2 | | PL3 | | PL4 | | |
| L2P S1 | PBAa | L2P S4 | PBAd | L2P S3 | PBAc | L2P S6 | PBAf | R1 |
| L2P S5 | PBAe | L2P S2 | PBAb | L2P S8 | PBAh | L2P S7 | PBAg | |
| ⋮ | | ⋮ | | ⋮ | | ⋮ | | |
| D2/PLG1 | | | | D2/PLG2 | | | | |
| PL1 | | PL2 | | PL3 | | PL4 | | |
| ⋮ | | ⋮ | | ⋮ | | ⋮ | | R2 |
| ⋮ | | | | | | | | ⋮ |
| Di/PLG1 | | | | Di/PLG2 | | | | |
| PL1 | | PL2 | | PL3 | | PL4 | | |
| ⋮ | | ⋮ | | ⋮ | | ⋮ | | Ri |

FIG.3D

L1 Map Table

| D1/PLG1 | | | | D1/PLG2 | | | |
|---|---|---|---|---|---|---|---|
| PL1 | | PL2 | | PL3 | | PL4 | |
| L2P S1 | PBAa | | | L2P S3 | PBAc | L2P S6 | PBAf |
| L2P S5 | PBAe | L2P S2 | PBAb | L2P S8 | PBAh | L2P S7 | PBAg |
| L2P S4 | PBAi | | | | | | |
| ⋮ | | ⋮ | | ⋮ | | ⋮ | |

▒ Update

MCB

L2 Cache Table

| Segment | LBA | PBA |
|---|---|---|
| L2P S2 | 5 | 5 |
|  | 6 | 6 |
|  | 7 | 7 |
|  | 8 | 8 |
| L2P S4 | 13 | 13 |
|  | 14 | 14 |
|  | 15 | 15 |
|  | 16 | 16 |
| L2P S6 | 21 | 21 |
|  | 22 | 22 |
|  | 23 | 23 |
|  | 24 | 24 |
|  | ⋮ | ⋮ |

CMDQ

| RCMD1(LBA3) |
| RCMD2(LBA9) |
| RCMD3(LBA1) |
| ⋮ |

CMD1(LBA3) => L2P S1 => D1/PL1 => PLG1 Read interleaving possible, and map read required
CMD2(LBA9) => L2P S3 => D1/PL3 => PLG2 L2P S1& L2P S3 cached and read at the same time
CMD3(LBA1) => L2P S1 => D1/PL1 => PLG1

DATA STORAGE DEVICE AND OPERATING METHOD THEREOF

CROSS-REFERENCE TO RELATED APPLICATION

The present application claims priority under 35 U.S.C. § 119(a) to Korean patent application number 10-2018-0009577, filed on Jan. 25, 2018, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

Recently, the paradigm of the computing environment has changed to a ubiquitous computing environment where a computer system can be used anytime and anywhere. Therefore, the use of portable electronic devices such as mobile phones, digital cameras and notebook computers has rapidly increased. A portable electronic device generally uses a data storage device including a memory device.

Since the data storage device using a memory device has no mechanical driver, the data storage device exhibits excellent stability and durability, accesses information at high speed, and has low power consumption. A data storage device having such advantages may include a universal serial bus (USB) memory device, a memory card having various interfaces, a universal flash storage (UFS) device, and a solid state drive (SSD).

SUMMARY

Various embodiments are directed to a data storage device with enhanced read performance, and an operating method thereof.

In an embodiment, a data storage device may include: a nonvolatile memory device including first and second memory regions configured to be read-interleaved with each other; and a processor configured to select a first read command among read commands received from a host device, select a second read command among the read commands excluding the first read command, and control the nonvolatile memory device to perform map read on the first and second read commands at the same time. The processor selects, as the second read command, at least one read command that is configured to be read-interleaved with the first read command.

In an embodiment, an operating method of a data storage device may include the steps of: selecting a first read command among read commands received from a host device; selecting a second read command configured to be read-interleaved with the first read command, among the read commands excluding the first read command; and controlling the nonvolatile memory device to perform map read on the first and second read commands at the same time.

BRIEF DESCRIPTION OF THE DRAWINGS

FIG. 3C illustrates an exemplary configuration of an L1 map table of FIG. 3A.

FIG. 3D illustrates a change in the storage positions of L2P segment entries stored in the L1 map table.

DETAILED DESCRIPTION

A data storage device and an operating method thereof according to embodiments of the present disclosure will be described below with reference to the accompanying drawings. Throughout the specification, reference to "an embodiment" or the like is not necessarily to only one embodiment, and different references to "an embodiment" or the like are not necessarily to the same embodiment(s).

Figure 1:
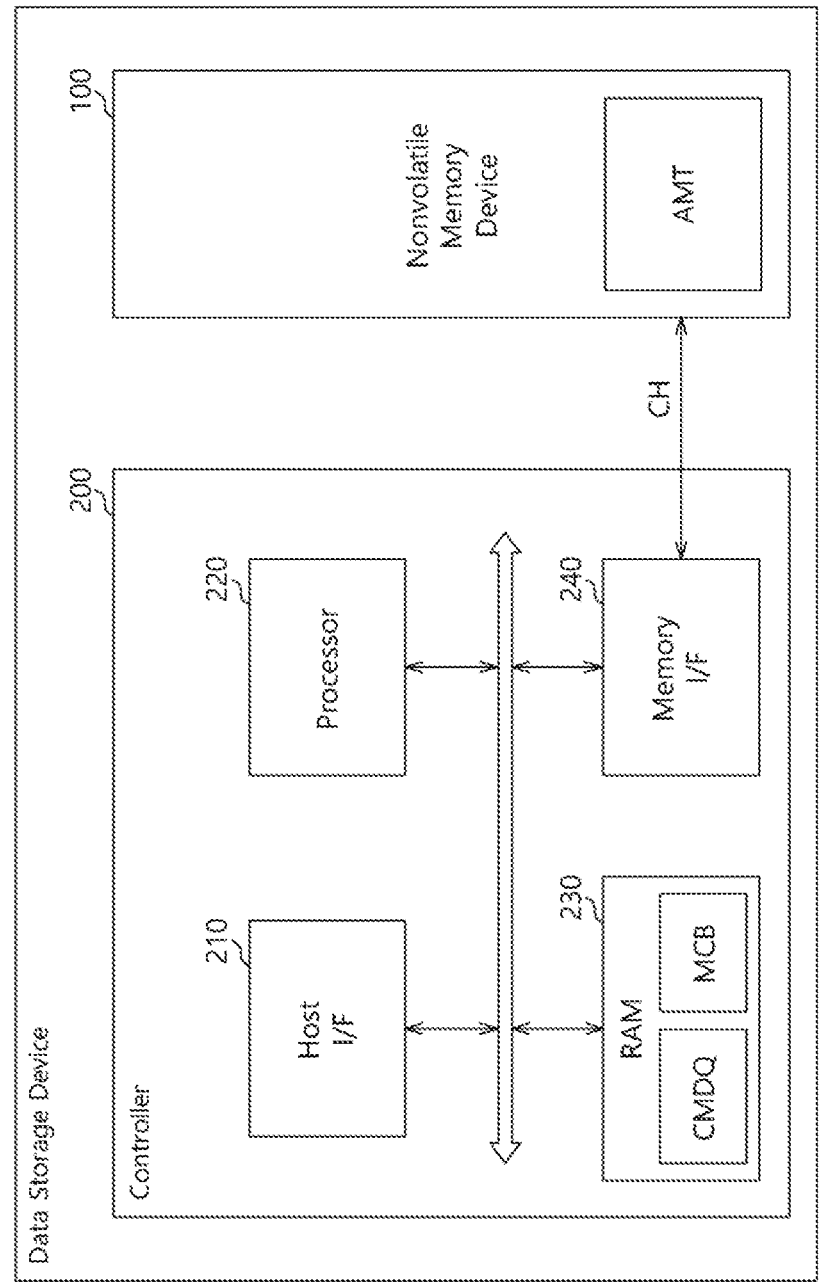
FIG. 1 is a block diagram illustrating a data storage device according to an embodiment of the present disclosure.

FIG. 1 is a block diagram illustrating a data storage device 10 in accordance with an embodiment. In the present embodiment, the data storage device 10 may store data which are accessed by a host device (not illustrated) such as a mobile phone, MP3 player, laptop computer, desktop computer, game machine, television (TV) or in-vehicle infotainment system. The data storage device 10 may be referred to as a memory system.

The data storage device 10 may be implemented as any one of various storage devices, depending on a host interface indicating a transmission protocol with the host device. For example, the data storage device 10 may be implemented with any one of various storage devices including a solid state drive (SSD), a multi-media card (e.g. MMC, eMMC, RS-MMC or micro-MMC), a secure digital (SD) card (e.g.

mini-SD or micro-SD), a universal storage bus (USB) storage device, a universal flash storage (UFS) device, a personal computer memory card international association (PCMCIA)-type storage device, a peripheral component interconnection (PCI) card-type storage device, a PCI express (PCI-e or PCIe) card-type storage device, a compact flash (CF) card, a smart media card and a memory stick.

The data storage device 10 may be fabricated as any one of various types of packages including a package-on-package (POP), a system-on-chip (SOC), a multi-chip package (MCP), a chip-on-board (COB), a wafer-level fabricated package (WFP) and a wafer-level stack package (WSP).

Referring to FIG. 1, the data storage device 10 may include a nonvolatile memory device 100 and a controller 200.

The nonvolatile memory device 100 may operate as a storage medium of the data storage device 10. Depending on memory cells, the nonvolatile memory device 100 may be implemented with any one of various nonvolatile memory devices including a NAND flash memory device, a NOR flash memory device, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide.

The nonvolatile memory device 100 may include a memory cell array having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells in the memory cell array may be set to a single level cell (SLC) capable of storing one bit data, a multi-level cell (MLC) capable of storing 2-bit data, a triple level cell (TLC) capable of storing 3-bit data, or a quad level cell (QLC) capable of storing 4-bit data. The memory cell array may include one or more of the SLC, the MLC, the TLC and the QLC. For example, the memory cell array may include memory cells in a two-dimensional (2D) structure or memory cells in a three-dimensional (3D) structure.

Figure 2A:
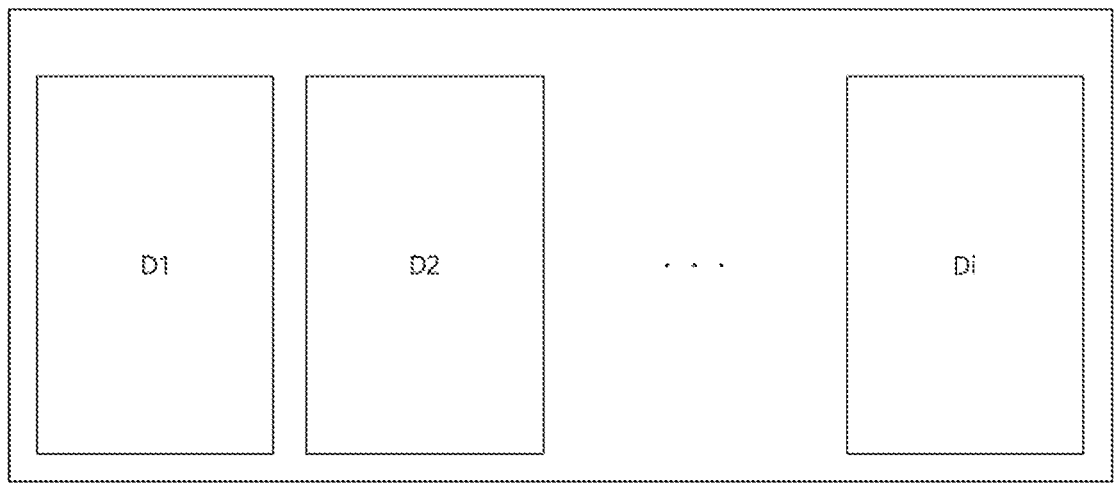
FIG. 2A illustrates an exemplary configuration of a nonvolatile memory device.
Figure 2B:
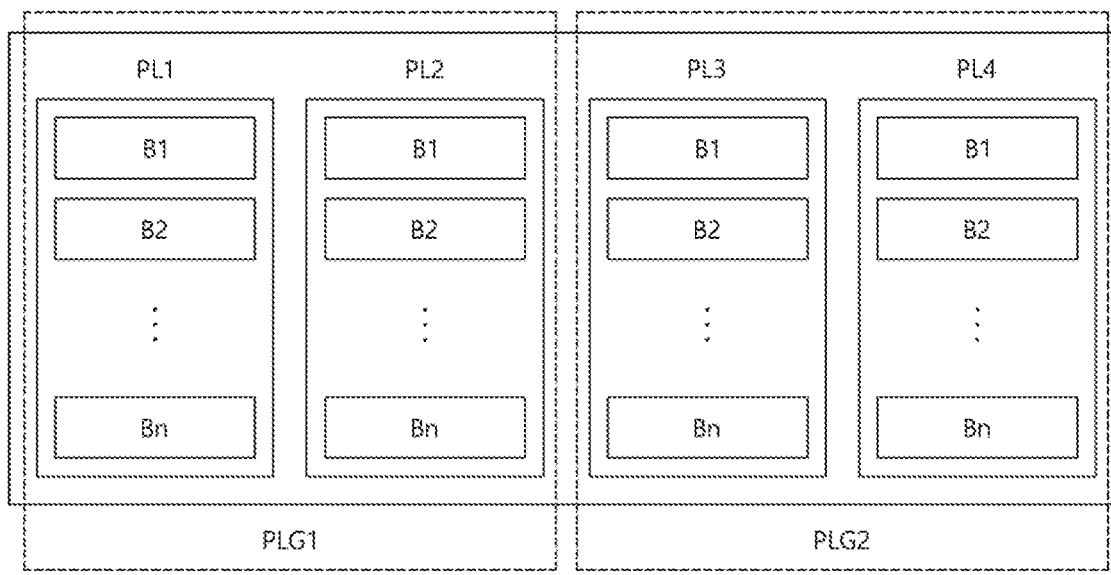
FIGS. 2B and 2C illustrate an exemplary configuration of a die included in the nonvolatile memory device of FIG. 2A.
Figure 2C:
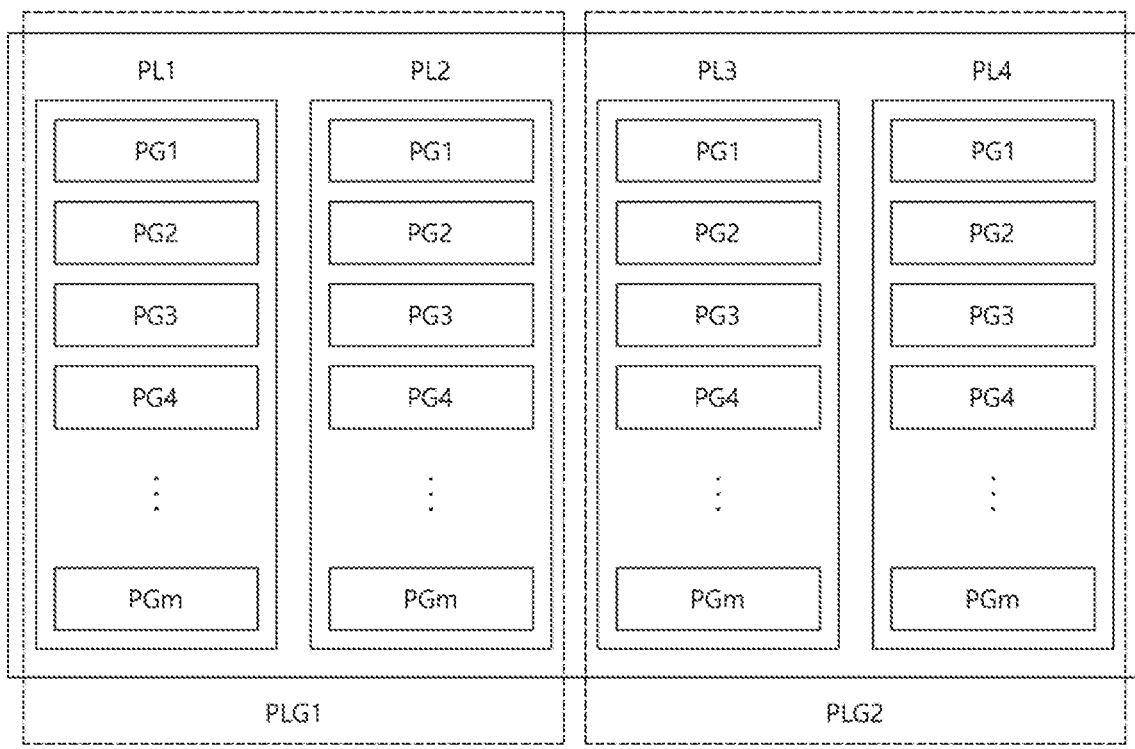

FIG. 2A illustrates a configuration of a nonvolatile memory device, for example, the nonvolatile memory device 100 of FIG. 1. FIGS. 2B and 2C illustrate an exemplary configuration of a die included in a nonvolatile memory device. Each of a plurality of dies D1 to Di in the nonvolatile memory device 100 may have the same configuration. Thus, for simplification, FIGS. 2B and 2C illustrate detail of a first die D1 with the understanding that the second to ith dies D2 to Di may have the same configuration.

Referring to FIG. 2A, the nonvolatile memory device 100 may include the plurality of dies D1 to Di.

Referring to FIG. 2B, the first die D1 may include a plurality of planes, for example, four planes PL1 to PL4. However, the number of planes in a die is not limited to any particular number. Each of the first to fourth planes PL1 to PL4 may include a plurality of memory blocks B1 to Bn.

The first to fourth planes PL1 to PL4 in the first die D1 may be divided into two plane groups PLG1 and PLG2. FIG. 2 illustrates that two adjacent planes, for example, the first and second planes PL1 and PL2, are set to one plane group, i.e., a first plane group PLG1, and the third and fourth planes PL3 and PL4 are set to another plane group, i.e. a second plane group PLG2.

Alternatively, each of the plane groups PLG may be generated in other ways, for example, by grouping remotely positioned planes instead of grouping adjacent planes. Furthermore, the number of planes groups in one die and the number of planes in each of the plane groups are not specifically limited, but may vary depending on design and need.

Although not illustrated in FIG. 2B, each of the memory blocks B1 to Bn in each of the first to fourth planes PL1 to PL4 may include a plurality of pages. For clarity, FIG. 2B illustrates only the memory blocks B1 to Bn, and FIG. 2C illustrates the plurality of pages in the memory blocks B1 to Bn.

Referring to FIG. 2C, each of the first to fourth planes PL1 to PL4 may include a plurality of pages PG1 to PGm, where m represents an integer greater than or equal to 1. Furthermore, when the number of pages in each of the memory blocks B1 to Bn illustrated in FIG. 2B is p, m may be n×p. That is, the number of pages in each of the planes PL1 to PL4 may be equal to the sum of the numbers of pages included in the respective memory blocks B1 to Bn in each of the planes PL1 to PL4.

In the present embodiment, each of the first and second plane groups PLG1 and PLG2 may correspond to a read interleaving unit by which read interleaving can be performed. The read interleaving may indicate that a plurality of memory regions are accessed at the same time, in order to perform read operations on the respective memory regions at the same time. The read interleaving unit may indicate a memory region by which the read interleaving can be performed.

In the present embodiment, the read interleaving may be performed on one plane selected from the planes in the first plane group PLG1, i.e., the first and second planes PL1 and PL2, and one plane selected from the planes in the second plane group PLG2, i.e., the third and fourth planes PL3 and PL4. For example, when the first plane PL1 and the third plane PL3 are selected from the first plane group PLG1 and the second plane group PLG2, respectively, one or more pages selected among the plurality of pages PG1 to PGm in the first plane PL1 and one or more pages selected among the plurality of pages PG1 to PGm in the third plane PL3 may be accessed at the same time, in order to perform the read interleaving.

Referring again to FIG. 1, the nonvolatile memory device 100 may include an address map table AMT.

Figures 3A, 3B:
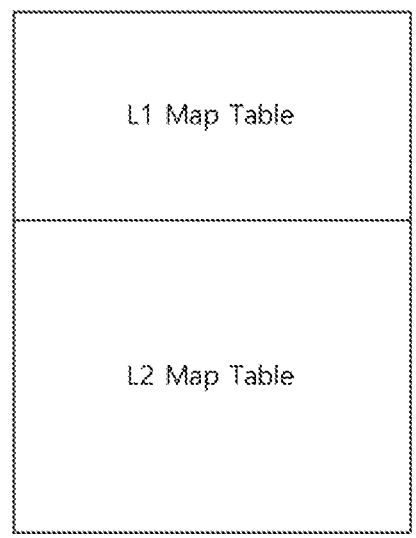
FIG. 3A illustrates an exemplary configuration of an address map table AMT.
FIG. 3B illustrates an exemplary configuration of an L2 map table of FIG. 3A.

FIG. 3A illustrates a configuration of the address map table AMT.

Referring to FIG. 3A, the address map table AMT may include an L1 map table and an L2 map table.

The L2 map table may store physical block addresses PBA corresponding to logical block addresses LBA. The logical block addresses LBA may be received from a host device.

FIG. 3B illustrates a configuration of an L2 map table of FIG. 3A, and FIG. 3C illustrates a configuration of an L1 map table of FIG. 3A.

Referring to FIG. 3B, the L2 map table may include a plurality of L2P segments L2P S1 to L2P Sj. The plurality of L2P segments L2P S1 to L2P Sj may be generated by dividing the entire logical addresses received from the host device into a predetermined number of groups. When the number of logical addresses which the host device may transmit to the data storage device 10 is k (for example, first to k-th logical addresses LBA1 to LBAk), each of the first to jth L2P segments L2P S1 to L2P Sj may include k/j logical addresses LBA. For example, when the number of logical addresses which the host device may transmit to the data storage device 10 is 10,000 and the number of L2P segments is 100, each of the L2P segments may include 100 logical addresses.

Each of the L2P segments L2P S1 to L2P Sj may include a plurality of physical addresses PBA corresponding to the respective logical addresses LBA. FIG. 3B illustrates that each of the L2P segments L2P S1 to L2P Sj includes four logical addresses LBA and four physical addresses PBA corresponding to the respective logical addresses LBA. One logical address LBA and one physical address PBA mapped to the logical address LBA may be referred to as a Logical-to-Physical (L2P) entry.

The L2P segments L2P S1 to L2P Sj may be updated. When the physical addresses PBA corresponding to the logical addresses LBA included in each of the L2P segments L2P S1 to L2P Sj are changed or newly allocated, the logical addresses LBA may be mapped to the changed or allocated physical addresses PBA, in order to update the L2P segments L2P S1 to L2P Sj. The update may be performed on an L2P-segment basis. The L2P segments L2P S1 to L2P Sj may be updated when a Physical-to-Logical (P2L) table is full of P2L entries, but the update time of the L2P segments L2P S1 to L2P Sj is not specifically limited thereto. The P2L table may be included in a random access memory, for example, 230 of FIG. 1.

For convenience, FIG. 3B illustrates that the L2P segments L2P S1 to L2P Sj of the L2P map table are sequentially stored. However, the L2P segments L2P S1 to L2P Sj may be randomly stored, and stored in different memory blocks. This is because, since the nonvolatile memory device 100 having the L2 map table stored therein cannot perform overwrite, the L2P segments L2P S1 to L2P Sj are stored in positions different from the positions where the L2P segments L2P S1 to L2P Sj had been stored before, whenever the L2P segments L2P S1 to L2P Sj are updated. Therefore, when an arbitrary L2P segment is updated, information on the position where the corresponding L2P segment is stored also needs to be updated.

Referring again to FIG. 3A, the L1 map table may store position information on the L2P segments L2P S1 to L2P Sj included in the L2 map table, i.e. the physical addresses PBA. One L2P segment and a physical address mapped to the L2P segment may be referred to as an L2P segment entry. The L1 map table may be configured to store L2P segment entries corresponding to the respective planes PL1 to PL4 of the plane groups PLG1 and PLG2 included in each of the dies D1 to Di.

Referring to FIG. 3C, the L1 map table may include first to ith regions R1 to Ri. For example, L2P segment entries including the logical addresses LBA mapped to the physical address PBA corresponding to the first die D1 may be stored in the first region R1. L2P segment entries including the logical addresses LBA mapped to the physical address PBA corresponding to the ith die Di may be stored in the ith region Ri.

The first to ith regions R1 to Ri may be divided into the plane groups included in the corresponding dies Di to Di (for example, the first and second plane groups PLG1 and PLG2). Each of the plane groups may be divided into the corresponding planes. For example, the first plane group PLG1 may be divided into the first and second planes PL1 and PL2, and the second plane group PLG2 may be divided into the third and fourth planes PL3 and PL4.

Each of the L2P segment entries for the respective L2P segments L2P S1 to L2P Sj may be stored in the corresponding position of the corresponding region of the L1 map table, according to a die, a plane group PLG and a plane PL which correspond to the physical addresses PBA in the corresponding L2P segment. For example, when the physical addresses PBA mapped to the logical addresses LBA in the first L2P segment L2P S1 correspond to the first plane PL1 of the first plane group PLG1 of the first die D1, an L2P segment entry including a physical address (for example, PBAa) for the first L2P segment L2P S1 may be stored in a position corresponding to the first plane PL1 of the first region R1 of the L1 map table, as illustrated in FIG. 3C.

FIG. 3D illustrates that the positions of the L2P segment entries stored in the L1 map table are changed. The positions of the L2P segment entries stored in the L1 map table may be changed during map update.

For example, when the positions of physical addresses PBA corresponding to logical addresses LBA included in the fourth L2P segment L2P S4 are changed to the first plane PL1 from the second plane PL2 of the first die D1, the L1 map table may be updated by changing the storage position of the L2P segment entry including the storage position information of the fourth L2P segment L2P S4 (for example, PBAi) to a position corresponding to the first plane PL1 of the first die D1, while the fourth L2P segment L2P S4 of which the mapped physical addresses were changed is stored in the L2 map table of the nonvolatile memory device 100, during the map update.

Referring again to FIG. 1, the controller 200 may include a host interface (I/F) 210, a processor 220, a random access memory (RAM) 230 and a memory interface (I/F) 240.

The host interface 210 may interface the host device (not illustrated) and the data storage device 10. For example, the host interface 210 may communicate with the host device using any one of standard transmission protocols including USB, UFS, MMC, parallel advanced technology attachment (PATA), serial advanced technology attachment (SATA), small computer system interface (SCSI), serial attached SCSI (SAS), peripheral component interconnection (PCI) and PCI-e.

The processor 220 may include a micro control unit (MCU) or a central processing unit (CPU). The processor 220 may process requests received from the host device. The processor 220 may drive a code-based instruction or algorithm, i.e., software, which is loaded into the RAM 230 in order to process the requests, and control internal function blocks and the nonvolatile memory device 100.

The RAM 230 may be implemented with a dynamic random access memory (DRAM) or static random access memory (SRAM). The RAM 230 may store the software driven by the processor 220. Furthermore, the RAM 230 may store data required for driving the software. That is, the RAM 230 may operate as a working memory of the processor 220.

When the nonvolatile memory device 100 is implemented with a flash memory device, the processor 220 may control unique operations of the nonvolatile memory device 100, and drive software referred to as a flash translation layer (FTL) in order to provide device compatibility to the host device. Through the operation of the FTL, the host device may recognize and use the data storage device 10 as a general data storage device such as a hard disk. The FTL loaded to the RAM 230 may include modules for performing various functions and meta data required for driving the modules.

The RAM 230 may temporarily store data which are to be transmitted to the nonvolatile memory device 100 from the host device or transmitted to the host device from the nonvolatile memory device 100. That is, the RAM 230 may operate as a data buffer memory or data cache memory.

The RAM 230 may include a command queue CMDQ for sequentially queuing commands received from the host device and a map cache buffer MCB for caching map data.

Figures 4A, 4B:
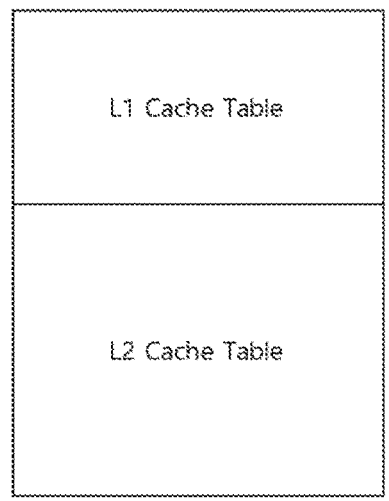
FIG. 4A illustrates an exemplary configuration of a map cache buffer of FIG. 1.
FIG. 4B illustrates an exemplary configuration of an L2 cache table of FIG. 4A.

FIG. 4A illustrates a configuration of the map cache buffer MCB.

Referring to FIG. 4A, the map cache buffer CB may include an L1 cache table and an L2 cache table.

The L1 cache table may be configured to store the L2P segment entries for the respective L2P segments L2P S1 to L2P Sj. The L1 cache table may correspond to the L1 map table which is read from the address map table AMT of the nonvolatile memory device 100, when the data storage device 10 is powered on. Therefore, the L1 cache table may have the same configuration as the L1 map table illustrated in FIG. 3C. In an embodiment, the L1 cache table may cache only a part of the L2P segment entries stored in the L1 map table.

FIG. 4B illustrates a configuration of the L2 cache table of FIG. 4A.

Referring to FIG. 4B, the L2 cache table may be configured to cache L2P segments read from the L2 map table of the address map table ANT, as shown in FIG. 3B. The L2 cache table may cache a part of the first to jth L2P segments L2P S1 to L2P Sj stored in the L2 map table of the address map table AMT. For example, the L2 cache table may cache L2P segments including a logical address which has been recently requested from the host device or is frequently requested from the host device. FIG. 4B illustrates that the second L2P segment L2P S2, the fourth L2P segment L2P S4 and the sixth L2P segment L2P S6 are cached in the L2 cache table.

When a read command and a logical address to read are received from the host device, the processor 220 may first check whether an L2P segment including the logical address to read is cached in the L2 cache table of the map cache buffer MCB. When the corresponding L2P segment is cached in the L2 cache table of the map cache buffer MCB, the processor 220 may translate the logical address to read into the corresponding physical address by referring to the cached L2P segment. When the corresponding L2P segment is not cached in the L2 cache table of the map cache buffer MCB, the processor 220 may read the corresponding L2P segment from the L2 map table of the address map table AMT of the nonvolatile memory device 100, cache the read L2P segment into the map cache buffer MCB, and translate the logical address to read into the corresponding physical address by referring to the cached L2P segment.

Such a series of processes of reading an L2P segment from the L2 map table of the address map table AMT in the nonvolatile memory device 100 and caching the read L2P segment into the map cache buffer MCB of the random access memory 230 may be referred to as a map read operation. As the number of map read operations is increased, the read performance may be inevitably degraded.

In the present embodiment, the processor 220 may select read commands RCMD which can be read-interleaved and require the map read operation, among the read commands RCMD queued in the command queue CMDQ, by referring to the L1 cache table, and map-read L2P segments for the selected read commands RCMD at the same time. Therefore, the number of map read operations may be reduced while the read performance may be improved.

Figures 5, 6:
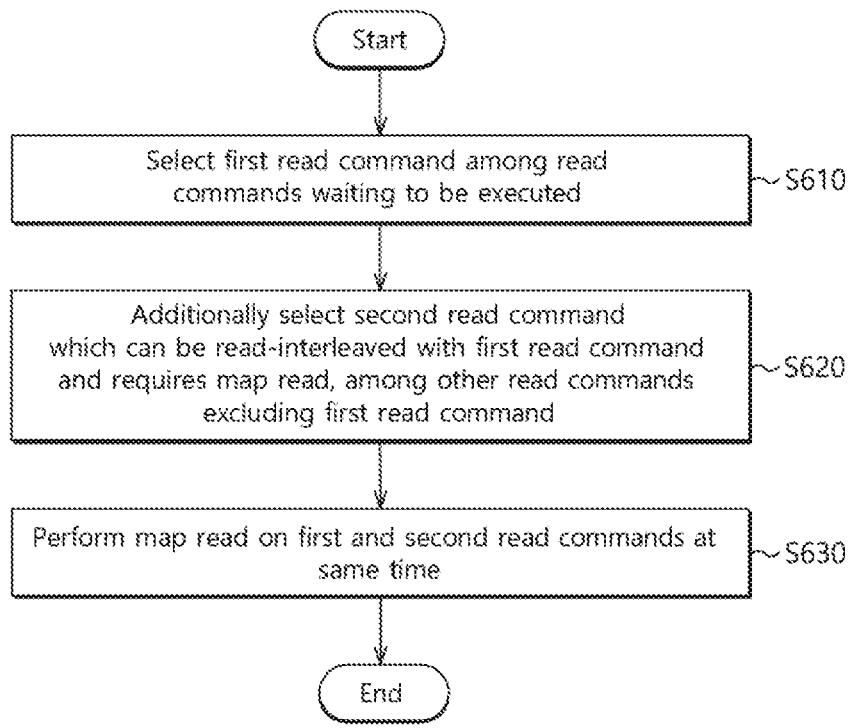
FIG. 5 illustrates exemplary read commands on which map read may be performed at the same time, among read commands waiting to be executed.
FIG. 6 is a flowchart illustrating an operating method of a data storage device according to an embodiment of the present disclosure.

FIG. 5 illustrates read commands which may perform map read operations at the same time, among read commands waiting to be executed. For convenience, it is supposed that three read commands RCMD1 to RCMD3 are queued in the command queue CMDQ of the RAM 230 shown in FIG. 1.

Referring to FIG. 5, the processor 220 may randomly select one read command among the read commands RCMD1 to RCMD3 which are queued in the command queue CMDQ and wait to be executed. The processor 220 may preferentially select a read command requiring a map read operation, among the read commands RCMD1 to RCMD3. For example, suppose that the first read command RCMD1 is selected. In that case, the processor 220 may additionally select another read command, among the unselected read commands (e.g., the second and/or third read command RCMD2 and RCMD3), which can be read-interleaved with the first read command RCMD1 and requires a map read operation, based on the selected first read command RCMD1.

The processor 220 may select a read command which can be interleaved with the first read command RCMD1, between the second and third read commands RCMD2 and RCMD3, by referring to the L1 cache table. For example, the processor 220 may check the position where an L2P segment (for example, L2P S1) entry including a logical address to read (for example, LBA3) for the first read command RCMD1 is stored, i.e. the first plane group PLG1 of the first die D1, by referring to the L1 cache table corresponding to L1 map table illustrated in FIG. 3C. Since a memory region which can be read-interleaved with the first plane group PLG1 of the first die D1 is the second plane group PLG2 of the first die D1, the processor 220 may select a read command having a logical address to read, which corresponds to the second plane group PLG2 of the first die D1, between the second and third read commands RCMD2 and RCMD3 queued in the command queue CMDQ.

That is, the processor 220 can check the positions where the L2P segment (L2P S3) entry including the logical address to read (for example, LBA9) for the second read command RCMD2 and the L2P segment (L2P S1) entry including the logical address to read (for example, LBA1) for the third read command RCMD3 are stored, by referring to the L1 cache table. Since the L2P segment (L2P S3) entry including the logical address to read (for example, LBA9) for the second read command RCMD2 is stored in a position corresponding to the second plane group PLG2 of the first die D1 as illustrated in FIG. 3C, the processor 220 may additionally select the second read command RCMD2.

The processor 220 may determine whether a map read operation is required to process the second read command RCMD2, by referring to the L2 cache table of the map cache buffer MCB. As illustrated in FIG. 4B, the third L2P segment L2P S3 for the second read command RCMD2 is not cached in the L2 cache table. Therefore, the processor 220 may determine that a map read operation for the second read command RCMD2 is required. When the third L2P segment L2P S3 for the second read command RCMD2 is cached in the L2 cache table, the processor 220 may determine that a map read operation for the second read command RCMD2 is not needed, and reselect a read command which can be read-interleaved with the first read command RCMD1 among the read commands waiting to be executed.

The processor 220 may control the nonvolatile memory device 100 to read the first and third L2P segments L2P S1 and L2P S3 for the first and second read commands RCMD1 and RCMD2 from the L2 map table of the address map table ANT of the nonvolatile memory device 100 at the same time. The processor 220 may cache the first and third L2P segments L2P S1 and L2P S3 provided from the nonvolatile memory device 100 into the map cache buffer NCB.

In the present embodiment, it has been described that map read operations for two read commands are performed at the same time. However, the present invention is not limited in this way; map read operations for all read commands which can be interleaved can be performed at the same time.

Since map read operations for read commands which can be read-interleaved can be performed at the same time, the number of map read operations may be reduced, which makes it possible to improve the read performance.

Referring again to FIG. 1, the memory interface 240 may control the nonvolatile memory device 100 according to control of the processor 220. The memory interface 240 may be referred to as a memory controller. The memory interface 240 may provide control signals to the nonvolatile memory device 100. The control signals may include a command and address for controlling the nonvolatile memory device 100. The memory interface 240 may provide data to the nonvolatile memory device 100, or receive data from the nonvolatile memory device 100. The memory interface 240 may be coupled to the nonvolatile memory device 100 through a channel CH including one or more signal lines.

FIG. 6 is a flowchart illustrating an operating method of a data storage device in accordance with an embodiment. While the operating method of the data storage device in accordance with the present embodiment is described with reference to FIG. 6, reference is also made to FIGS. 1 to 4B.

At step S610, the processor 220 of FIG. 1 may select a first read command among read commands which are queued in the command queue CMDQ while waiting to be executed. The processor 220 may select a read command requiring a map read operation as the first read command.

At step S620, the processor 220 may additionally select a second read command which can be read-interleaved with the first read command and requires a map read operation, among the other read commands.

At step S630, the processor 220 may perform map read on the first and second read commands selected at steps S610 and S620, respectively.

Figure 7:
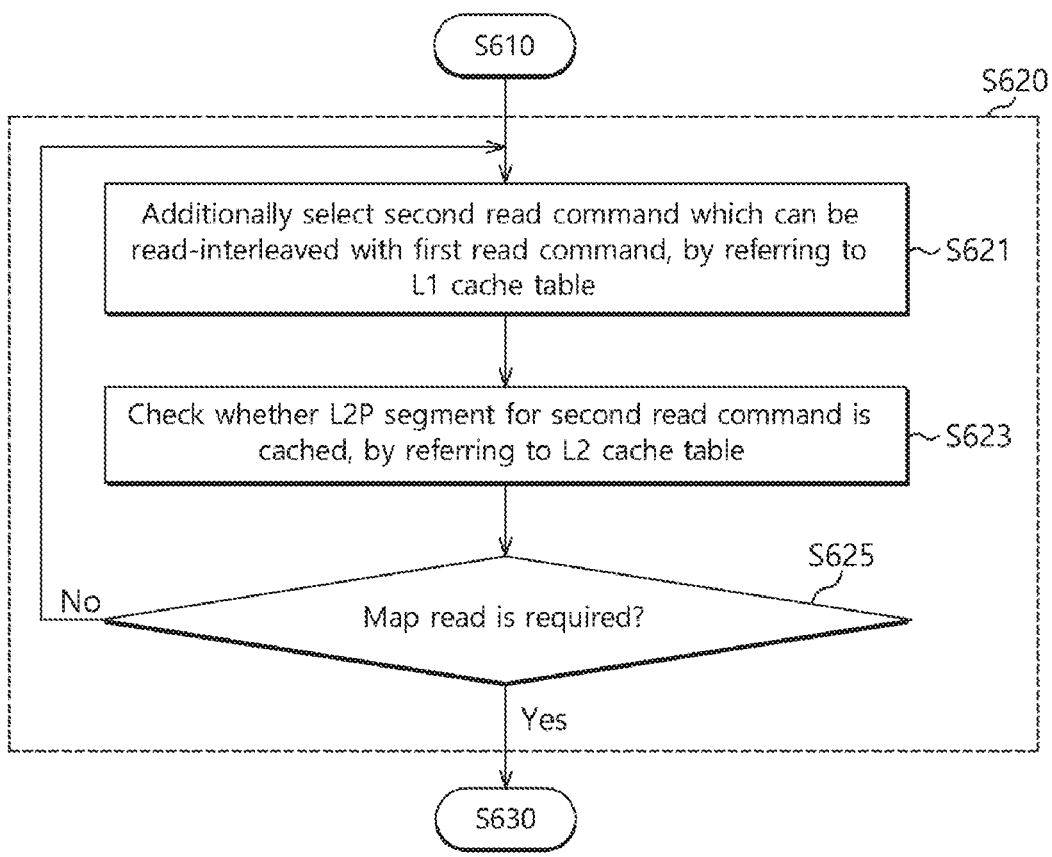
FIG. 7 is a flowchart illustrating detail of step S620 of FIG. 6 according to an embodiment of the present disclosure.

FIG. 7 is a flowchart illustrating detail of step S620 in accordance with an embodiment. Referring to FIG. 7, the operation of the processor 220 to additionally select the second read command will be described as follows.

At step S621, the processor 220 may select the second read command which can be read-interleaved with the first read command, among the other read commands waiting to be executed, by referring to the L1 cache table shown in FIG. 4A or the L1 map table shown in FIG. 3C. Since the read interleaving and the operation of determining whether read interleaving is possible have been described above in detail, description thereof is omitted here.

At step S623, the processor 220 may check whether an L2P segment for the second read command is cached, by referring to the L2 cache table shown in FIG. 4B.

At step S625, the processor 220 may determine whether a map read operation for the second read command is required. For example, the processor 220 may determine whether a map read operation for the second read command is required, based on the result obtained by checking whether the L2P segment for the second read command is cached, with reference to the L2 cache table, at step S623.

When it is determined that the map read operation for the second read command is required, the method may proceed to step S630. On the other hand, when it is determined that the map read operation for the second read command is not required, the method may return to step S621, and the processor 220 may reselect the second read command which can be read-interleaved with the first read command selected before.

In accordance with embodiments, the data storage device may perform map read operations on read commands which can be read-interleaved with each other, among read commands waiting to be executed.

Therefore, the number of map read operations can be reduced while the read performance is enhanced.

Figure 8:
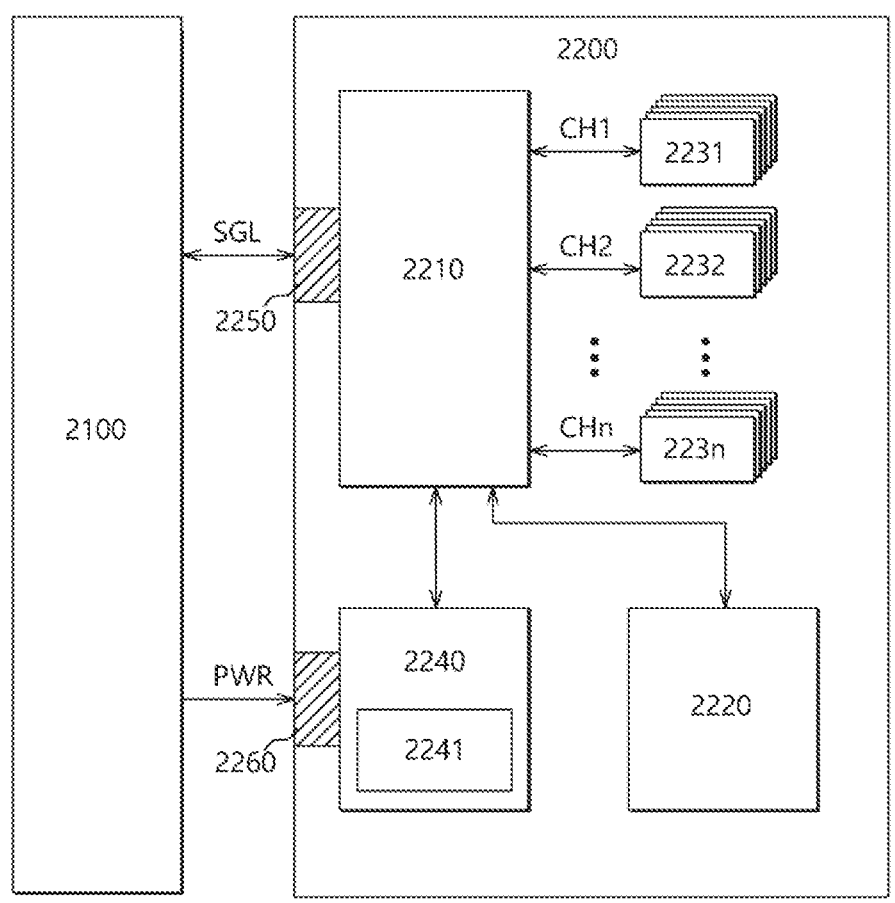
FIG. 8 is a diagram illustrating a data processing system including a solid state drive (SSD) according to an embodiment of the present disclosure.

FIG. 8 is a diagram illustrating a data processing system 2000 according to an embodiment. Referring to FIG. 8, the data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include at least one capacitor having large capacity capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interfacing method between the host device 2100 and the SSD 2200.

Figure 9:
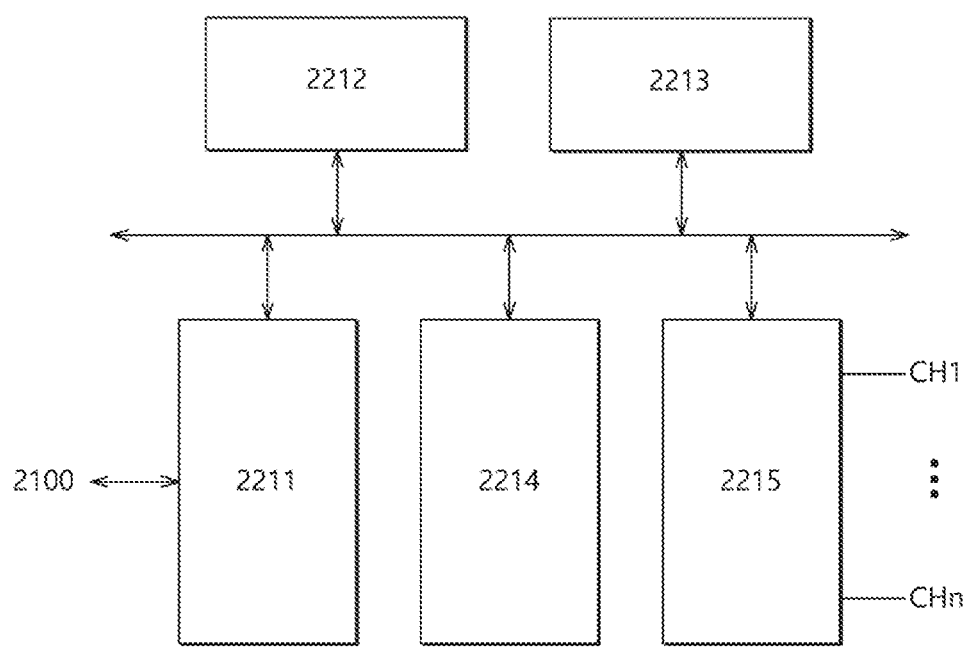
FIG. 9 is a diagram illustrating an exemplary controller illustrated in FIG. 8.

FIG. 9 is a diagram illustrating the controller 2210 of FIG. 8. Referring to FIG. 9, the controller 2210 may include a host interface 2211, a control component 2212, a random access memory (RAM) 2213, an error correction code (ECC) component 2214, and a memory interface 2215.

The host interface 2211 may perform interfacing between the host device 2100 and the SSD 2200 according to a protocol of the host device 2100. For example, the host interface 2211 may communicate with the host device 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface 2211 may perform a disc emulation function that the host device 2100 recognizes the SSD 2200 as a general-purpose data storage apparatus, for example, a hard disc drive HDD.

The control component 2212 may analyze and process the signal SGL input from the host device 2100. The control component 2212 may control operations of internal functional blocks according to firmware and/or software for driving the SSD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 10:
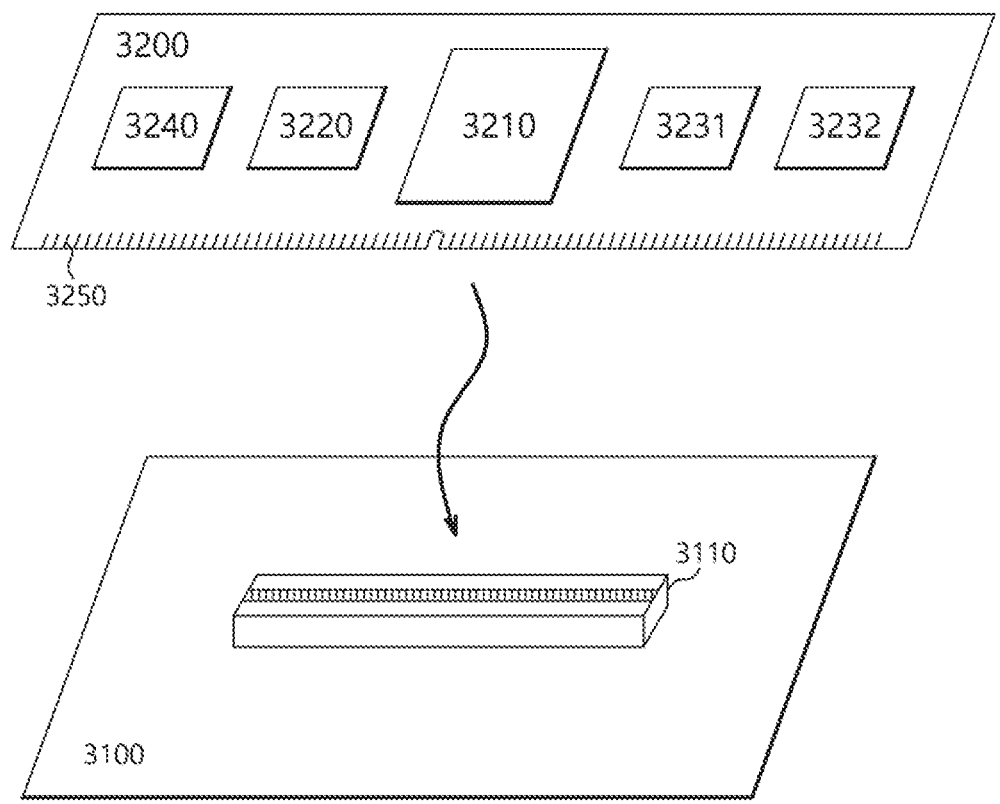
FIG. 10 is a diagram illustrating a data processing system including a data storage device according to an embodiment of the present disclosure.

FIG. 10 is a diagram illustrating a data processing system 3000 according to an embodiment. Referring to FIG. 10, the data processing system 3000 may include a host device 3100 and a data storage device 3200.

The host device 3100 may be configured in a board form such as a printed circuit board (PCB). Although not shown in FIG. 10, the host device 3100 may include internal functional blocks configured to perform functions of the host device 3100.

The host device 3100 may include a connection terminal 3110 such as a socket, a slot, or a connector. The data storage device 3200 may be mounted on the connection terminal 3110.

The data storage device 3200 may be configured in a board form such as a printed circuit board (PCB). The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host device 3100. A signal such as a command, an address, and data and power may be transmitted between the host device 3100 and the data storage device 3200 through the connection terminal 3250. The connection terminal 3250 may be configured in various forms according to an interfacing method between the host device 3100 and the data storage device 3200. The connection terminal 3250 may be arranged in any one side of the data storage apparatus 3200.

Figure 11:
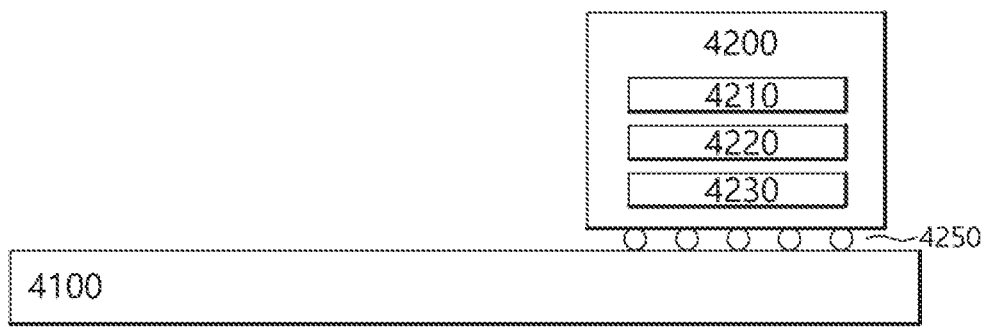
FIG. 11 is a diagram illustrating a data processing system including a data storage device according to an embodiment of the present disclosure.

FIG. 11 is a diagram illustrating a data processing system 4000 according to an embodiment. Referring to FIG. 11, the data processing system 4000 may include a host device 4100 and a data storage device 4200.

The host device 4100 may be configured in a board form such as a printed circuit board (PCB). Although not shown in FIG. 11, the host device 4100 may include internal functional blocks configured to perform functions of the host device 4100.

The data storage device 4200 may be configured in a surface mounting packaging form. The data storage device 4200 may be mounted on the host device 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host device 4100 or the nonvolatile memory device 4230 through control of the controller 4210.

The nonvolatile memory device 4230 may be used as a storage medium of the data storage device 4200.

Figure 12:
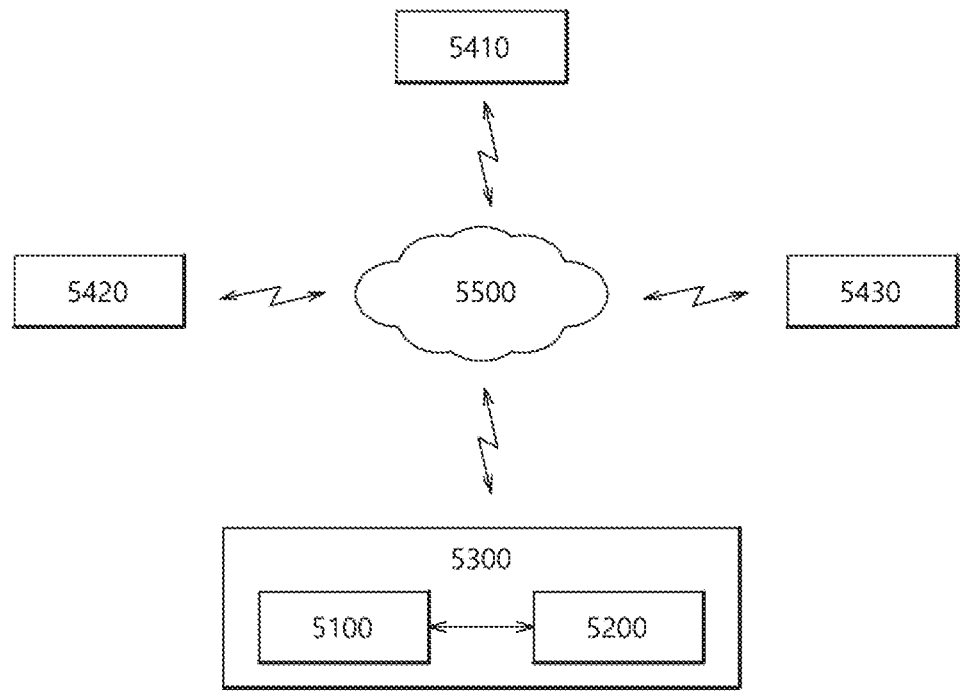
FIG. 12 is a diagram illustrating a network system including a data storage device according to an embodiment of the present disclosure.

FIG. 12 is a diagram illustrating a network system 5000 according to an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured of the data storage device 10 of FIG. 1, the data storage device 2200 of FIG. 8, the data storage device 3200 of FIG. 10, or the data storage device 4200 of FIG. 11.

Figure 13:
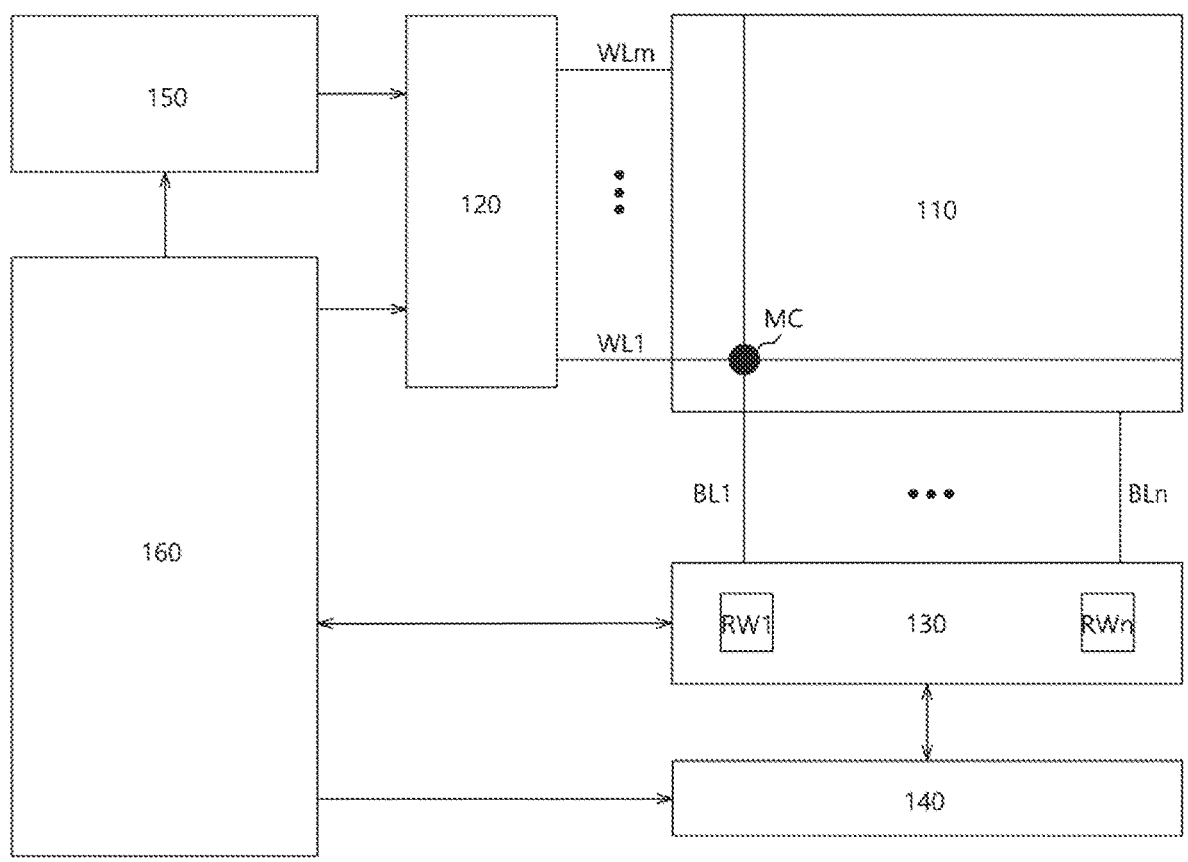
FIG. 13 is a block diagram illustrating a nonvolatile memory device included in a data storage device according to an embodiment of the present disclosure.

FIG. 13 is a block diagram illustrating a nonvolatile memory device 100 included in a data storage device according to an embodiment. Referring to FIG. 13, the nonvolatile memory device 100 may include a memory cell array 110, a row decoder 120, a column decoder 140, a data read and write (read/write) block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate, not limit, the present invention. Various alternatives and equivalents are possible, as would be apparent to those skilled in the art in light of the foregoing disclosure. Thus, the invention is not limited by the embodiments described herein. Nor is the invention limited to any specific type of semiconductor device. All variations and modifications apparent to those skilled in the art in view of the present disclosure are included to the extent they fall within the scope of the appended claims.

What is claimed is:

1. A data storage device comprising:
   a nonvolatile memory device comprising first and second memory regions configured to be read-interleaved with each other; and
   a processor configured to:
   select a first read command for which a corresponding logical-to-physical (L2P) segment is not cached in a random access memory (RAM) among read commands received from a host device,
   select a second read command that is configured to be read-interleaved with the first read command among read commands excluding the first read command, wherein the second read command is a read command for which a corresponding L2P segment is not cached in the RAM, and
   control the nonvolatile memory device to perform map read on the first and second read commands at the same time, and
   wherein the map read includes reading mapping information for translating logical addresses corresponding to the first and second read commands with physical addresses from the nonvolatile memory device and caching the read mapping information in the RAM.

2. The data storage device according to claim 1, wherein the RAM includes a command queue for queuing the read commands received from the host device,
   wherein the processor selects the first and second read commands among the read commands queued in the command queue.

3. The data storage device according to claim 2, wherein the RAM comprises:
   an L1 cache table in which logical-to-physical (L2P) segments including physical addresses corresponding to the first memory region and L2P segments including physical addresses corresponding to the second memory region are stored so as to be distinguished from each other for the respective memory regions; and
   an L2 cache table configured to cache a part of the L2P segments for the first and second memory regions.

4. The data storage device according to claim 3, wherein the processor selects, as the first read command, a read command requiring the map read among the read commands based on the L2 cache table.

5. The data storage device according to claim 3, wherein the processor selects a read command that is configured to be read-interleaved with the first read command among read commands by referring to the L1 cache table,
   checks whether an L2P segment corresponding to the selected read command is cached in the RAM by referring to the L2 cache table, and determines whether the map read for the selected read command is required.

6. The data storage device according to claim 5, wherein when the map read for the selected read command is required, the processor selects the selected read command as the second read command, and controls the nonvolatile memory device to perform the map read on the first and second read commands at the same time.

7. The data storage device according to claim 5, wherein when map read for the selected read command is not required, the processor selects, as the second read command, a read command that is configured to be read-interleaved with the first read command and that requires the map read, among read commands excluding the first read command and the selected read command.

8. An operating method of a data storage device which includes a nonvolatile memory device including first and second memory regions configured to be read-interleaved with each other and a controller for controlling an operation of the nonvolatile memory device, the operating method comprising:

selecting a first read command for which a corresponding logical-to-physical (L2P) segment is not cached in a random access memory (RAM) among read commands received from a host device;

selecting a second read command configured to be read-interleaved with the first read command, among read commands excluding the first read command, wherein the second read command is a read command for which a corresponding L2P segment is not cached in the RAM; and controlling the nonvolatile memory device to perform map read on the first and second read commands at the same time, wherein the map read includes reading mapping information for translating logical addresses corresponding to the first and second read commands with physical addresses from the nonvolatile memory device and caching the read mapping information in the RAM.

9. The operating method according to claim 8, wherein the selecting of the first read command comprises selecting, as the first read command, a read command requiring map read, among the read commands received from the host device.

10. The operating method according to claim 8, wherein the RAM includes an L1 cache table in which logical-to-physical (L2P) segments including physical addresses corresponding to the first memory region and L2P segments including physical addresses corresponding to the second memory region are stored so as to be distinguished from each other for the respective memory regions; and an L2P cache table for caching a part of the L2P segments.

11. The operating method according to claim 10, wherein the selecting of the second read command comprises:

selecting a read command that is configured to be read-interleaved with the first read command among read commands by referring to the L1 cache table; and checking whether an L2P segment for the selected read command is cached in the RAM by referring to the L2 cache table, and determining whether the map read for the selected read command is required.

12. The operating method according to claim 11, further comprising:

selecting the selected read command as the second read command, when the map read for the selected read command is required.

13. The operating method according to claim 11, further comprising:

selecting, as the second read command, a read command that is configured to be read-interleaved with the first read command and that requires the map read, among read commands excluding the first read command and the selected read command, when the map read for the selected read command is not required.

* * * * *